United States Patent [19]
Juvkam-Wold

[11] 3,964,557

[45] June 22, 1976

[54] TREATMENT OF WEIGHTED DRILLING MUD

[75] Inventor: Hans C. Juvkam-Wold, Monroeville, Pa.

[73] Assignee: Gulf Research & Development Company, Pittsburgh, Pa.

[22] Filed: Oct. 11, 1974

[21] Appl. No.: 513,998

[52] U.S. Cl............................ 175/66; 175/206
[51] Int. Cl.² ................. C09K 7/00; E21C 7/00
[58] Field of Search................. 166/65, 66, 206; 209/211

[56] References Cited
UNITED STATES PATENTS

| | | | |
|---|---|---|---|
| 2,886,287 | 5/1959 | Croley | 209/211 |
| 2,919,898 | 1/1960 | Marwil et al. | 209/211 |
| 2,923,151 | 2/1960 | Engle et al. | 175/206 |
| 2,928,546 | 3/1960 | Church | 209/211 |
| 2,941,783 | 6/1960 | Stinson | 175/66 |
| 2,954,871 | 10/1960 | Lummus et al. | 209/211 |
| 3,025,965 | 3/1962 | Bergmann et al. | 209/211 |
| 3,289,775 | 12/1966 | Stone | 175/66 |
| 3,558,545 | 1/1971 | Lummus | 175/66 |
| 3,684,038 | 8/1972 | Nelson | 175/66 |
| 3,713,499 | 1/1973 | Arscott et al. | 175/66 |
| 3,737,037 | 6/1973 | Bone | 175/66 |

*Primary Examiner*—Ernest R. Purser
*Assistant Examiner*—Jack E. Ebel

[57] ABSTRACT

Drilling mud having a high density capable of countering high pressures in formations penetrated by the borehole of a well is prepared by delivering a drilling mud having barite suspended in it into a cyclone separator at a rate which causes the pressure drop in the liquid as it passes through the cyclone separator to exceed 500 psi. A suspension of barite in drilling mud liquids is discharged as underflow from the cyclone separators. That suspension, which has a density in the range of 16 to 20 pounds per gallon, is either blended with a controlled amount of drilling mud liquids to produce a drilling mud of the desired density or pumped directly into the well to place a slug of very high density drilling mud in the well.

6 Claims, 1 Drawing Figure

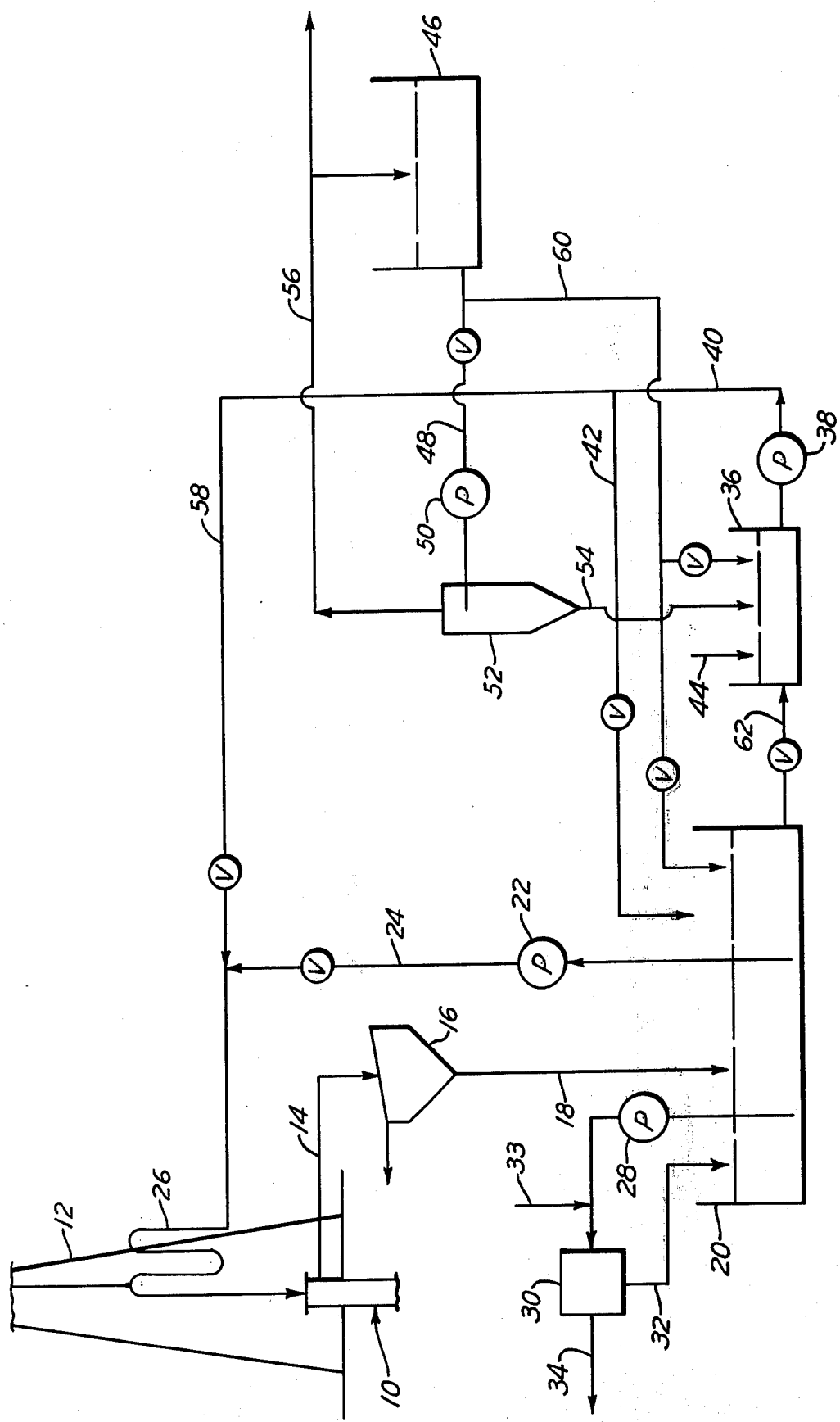

TREATMENT OF WEIGHTED DRILLING MUD

This invention relates to the drilling of wells and more particularly to the treatment of drilling mud used in rotary drilling operations and especially to the treatment of weighted drilling muds.

In the rotary drilling operation, drilling mud, ordinarily a thin slurry of finely divided solids in a liquid which may, for example, be clear water and oil, an emulsion of water and oil, or a suspension of clays in liquid, is circulated down drill pipe extending down the well and discharged from a drill bit at the lower end of drill pipe. The drilling mud washes the bottom of the borehole and carries cuttings of rock broken from the bottom by the drill bit upwardly through the annulus surrounding the drill pipe. The drilling mud is discharged at the surface and is treated to separate cuttings to recondition the liquid portion of the drilling mud for recirculation through the well.

An important function of the drilling mud is to create a hydrostatic pressure within the borehole of the wall adequate to counter or overbalance the pressure in formations penetrated by the borehole. In some instances, the pressure in the formations is very high, and it is necessary that the drilling mud have a high density well above the density of water to establish a hydrostatic pressure that will prevent formation fluids from flowing into the well during the drilling operation. Weighting agents are suspended in the drilling mud to give the drilling mud the required density. Barite in the form of finely divided particles 95 percent of which has a size less than 45 microns in diameter is the most frequently used weighting agent. The barite constitutes an important part of the cost of drilling mud used in drilling through high-pressure formations.

In U.S. Pat. No. 2,919,898 of Marwil et al, it is suggested that the barite be separated from clay and fine sand in a cyclone separator. Both theory and experience have indicated that a sharp separation of barite and fine sand cannot be achieved even if the drilling mud is extensively diluted with water to reduce its density and viscosity because of the overlapping of the sizes in barite, fine sand, and large clay particles. Settling of solid particles from liquids is described by Stokes Law regardless of whether the separation is in a settling pond, cyclone separator or centrifuge. That law shows that clay or sand particles will settle at the same rate as barite particles having a diameter approximately two-thirds the diameter of the clay or sand particles. The barite separated is mixed with the drilling mud liquids before returning to the well.

U.S. Pat. No. 2,870,990 of Bergey describes a system for recovery of barite from drilling mud utilizing two centrifuges connected in series. A stream of drilling mud from the mud pit is delivered to the first centrifuge in which barite is separated from drilling mud liquids which are delivered to the second centrifuge. Clay solids separated in the second centrifuge are discarded from the system and the liquids are returned to the mud pit.

In an effort to reduce the cost of drilling mud and particularly to reduce expenditures for barite weighted drilling mud used in drilling, weighted drilling mud from one well is circulated from the well during well completion operations and is placed in storage for use in the subsequent drilling of other wells. Typically, the stored drilling mud has a density in the range of approximately 12 pounds per gallon. Such a drilling mud is useful in drilling through some high-pressure formations but is not effective in increasing the density of the drilling mud as rapidly as may be desired if a high pressure flow of formation fluids into the well is encountered. It is then necessary to add new barite to the system with a consequent increased drilling mud expense.

This invention resides in a method of quickly increasing the density of a drilling mud used in the drilling of a well to above about 14 pounds per gallon to counter high formation pressures encountered during the drilling wherein drilling mud having a weighting agent suspended therein is passed through a cyclone separator at a high rate such that the pressure drop through the cyclone separator is at least 500 psi, and preferably 1000 psi, or even more, to produce an underflow having a density in the range of approximately 16 to 20 pounds per gallon. The underflow is circulated into the well to increase the density of the drilling mud in the well. In one embodiment, the underflow is blended at a controlled rate with a portion of the drilling mud that is being used in the drilling operation to produce a drilling mud of desired density, and in another embodiment the underflow is pumped directly into the well without any such blending to position a slug of very high-density drilling mud in the well.

The single FIGURE of the drawing is a diagrammatic flow sheet of a system for treating weighted drilling mud utilizing this invention.

Referring to the drawing, a well indicated generally by reference numeral 10 is provided with the usual derrick 12 and other equipment, not shown, customarily used in conventional rotary drilling operations. A drilling mud discharge line 14 extends from the well to a shale shaker 16. Shale shaker 16 is of conventional construction with a sloping screen across its upper end onto which the drilling mud is discharged. The screen is usually provided with means for vibrating it to aid the movement of the solid particles which cannot pass through the screen to the lower end of the screen where those particles are discharged to waste. The screen of shale shaker 16 may, for example, have openings of 80 mesh which will remove from the drilling mud all particles larger than 177 microns in diameter. In some instances, shale shakers have screens as small as 200 mesh and will remove particles larger than 75 microns.

Drilling mud passing through the shale shaker 16 is delivered through a line 18 to a mud pit 20. The drilling mud is picked up from mud pit 20 by a pump 22 and delivered through lines 24 and 26 to the well 10 for reuse in the drilling operation. A side stream of drilling mud from the mud pit is delivered by a pump 28 to a suitable separator 30 in which barite and formation particles are separated from the drilling mud liquids and returned to the mud pit 20 through a line 32. Separator 30 may be a centrifuge or a cyclone separator capable of handling a liquid at rates causing a pressure drop of 500 psi or more whereby silt or clay particles larger than about 10 microns, and barite particles larger than about 6 microns, are separated from the drilling mud liquids and smaller clay particles. Separation in separator 30 of solids from the drilling mud is facilitated by dilution with water through line 33. If adequate water is available, sufficient water can be added to allow separation in a conventional cyclone separator of barite from the very fine clay particles suspended in drilling mud liquids. The drilling mud liquids and fine clay solids separated from barite in separator 30 are discarded from the system through line 34.

In some installations it may be desirable to deliver drilling mud liquids discharged from the shale shaker to cyclone separators, referred to as desanders, adapted to remove solid particles larger than about 75 microns in diameter from the drilling mud liquids. The desanded drilling mud liquids are delivered to the mud pit for recirculation through the well.

The drilling mud system includes a mixing tank 36 in which weighting agent and other drilling mud ingredients are mixed with the drilling mud. Drilling mud can be delivered by a pump 38 through lines 40 and 42 to the mud pit 20. Weighting agent, liquids, and other chemicals for the drilling mud can be added at the mixing tank 36, as indicated, by line 44. The shale shaker, mud pit, mixing tank, separator and circulating pumps constitute the normal mud circulating system at the wellhead.

Weighted drilling mud that has been obtained from other wells and typically has a density of approximately 12 pounds per gallon is stored in a mud storage tank 46. A feed line 48 from the mud storage tank 46 is connected to a high-pressure pump 50, the outlet of which is connected to a cyclone 52. Pump 50 is capable of imparting a pressure of at least 500 psi and preferably in excess of 1,000 psi on drilling mud flowing to it through line 48. The drilling mud is delivered to the cyclone separator at a rate causing a pressure drop of at least 500 psi which results in an underflow having a density of 16 to 20 pounds per gallon. The underflow from cyclone separator 52 is discharged into an underflow delivery line 54 for delivery into mixing tank 36. Overflow from the cyclone separator is either returned to the mud tank through line 56 or discharged to waste. Line 40 from the outlet of pump 38 is connected by means of a line 58 to line 26 for circulation of drilling mud from mixing tank 36 directly into the well 10.

Heretofore, cyclone separators have been operated at flow rates causing maximum pressure drops through the cyclone separator of approximately 60 psi. Higher pressure drops through the cyclone separators were believed to cause increased turbulence in the cyclone separators, and it was believed that the increased turbulence would interfere with the separation of solid particles and liquid in the separator. I have found that when the pressure drop through the cyclone separator exceeds 500 psi, the separation is actually improved and the median size of the particles in the underflow from the cyclone separator can be reduced substantially. The high pressure drop through the cyclone separator 58 allows recovery of approximately 90 percent of the barite in the underflow stream without diluting the drilling mud with water to reduce its viscosity and density.

The high velocity of the liquid resulting from the increased flow rate through the cyclone separators when they operate with a pressure drop exceeding 500 psi causes severe erosion which precludes use of the ordinary commercial cyclone separators. It is essential that all internal parts of the cyclone separator exposed to the high velocity drilling mud be constructed of an abrasion-resistant material such as tungsten carbide. Cyclone separators suitable for use in this invention are described in my copending application Ser. No. 501,775, filed Aug. 29, 1974, entitled Method and Apparatus for the Treatment of Drilling Mud. Cyclone separators suitable for use in this invention to provide a drilling mud of the desired high density are of a nominal size ranging from 1½ inches to 4 inches. The term nominal size designates the diameter of the cylindrical portion of the chamber within the cyclone separators. Cyclone separators smaller than 1½ inches have too small a flow capacity to handle the large volumetric flow rates that are desired and, further, may become plugged by solid particles in the drilling mud. Cyclone separators larger than 4 inches have a very low efficiency in separating particles having a size in the range of barite particles.

In the operation of this invention, the drilling mud stored in storage tank 46 will typically have a density of 12-14 pounds per gallon. The drilling mud in mud pit 20 used in the normal drilling operation will normally have approximately the same density. If it is merely desired to increase the volume of drilling mud in the circulating system, drilling mud from storage tank 46 can be delivered through line 60 into mixing tank 36 and pumped from the mixing tank either into the mud pit or directly into the well.

If it is desired to cause a gradual increase in the density of the drilling mud in the drilling mud circulating system, drilling mud is drawn from storage tank 46 through line 48 and pumped at a high pressure exceeding 500 psi into the cyclone separator 52. The underflow from the cyclone separator, having a density in the range of 16–20 pounds per gallon, is delivered into mixing tank 36. Drilling mud from the mud pit 20 can be delivered at a carefully controlled rate into mixing tank 36 through line 62 for mixture with the underflow from separator 52 to produce a drilling mud of the desired increased density. That drilling mud can be either recirculated to the mud pit or, if a faster increase in the density of drilling mud in the hole is desired, pumped directly to the well.

If it is desired to inject a slug of very high density drilling mud into the well, for example, a drilling mud of 16–20 pounds per gallon, the underflow from the high pressure drop cyclone separator 52 is delivered into the mixing tank 36 and pumped by pump 38 through lines 40, 58 and 26 into the well without mixing with drilling mud from the mud pit 20. That flow is continued to locate a slug of desired size of high-density mud in the well or if necessary to replace all of the mud in the well with the high density mud.

The method herein described provides a method for quickly adjusting the density of drilling mud in a well to counter changes in conditions in the well that might occur. Heretofore, rapid and substantial increases in the density of the drilling mud in a drilling system were accomplished by the addition of fresh barite to the system. Stored weighted drilling mud usually has a density too low to be of value in increasing the density of the drilling mud to a safe range when upset conditions are encountered. By passing the stored weighted drilling mud through a cyclone separator at a rate which causes a pressure drop over 500 psi, the density of the underflow is nearly as high as can be attained in a pumpable and readily operable suspension of barite in drilling mud liquid. That very high density suspension of barite is admirably suited for blending with a controlled amount of drilling mud to produce a drilling mud of a high density for delivery to the well to counter high pressures or for delivering directly into the well to spot slugs of very high density drilling mud in the well.

I claim:

1. A system for the rotary drilling of wells utilizing a weighted drilling mud comprising a shale shaker, a mud pit, means for delivering drilling mud discharged from the well onto the shale shaker and means for transferring drilling mud passing through the shale shaker to the mud pit, a return line from the mud pit to the well, pumping means for delivering drilling mud from the mud pit through the return line to the well, a storage tank for storage of previously used weighted drilling mud, a cyclone separator adapted to withstand a high pressure, pumping means for delivering weighted drilling mud from the storage tank into the cyclone separator at a high velocity causing a pressure drop of at least 500 psi through the cyclone separator, and circulating means for delivering underflow from the cyclone separator to the well without passing through the mud pit.

2. A system as set forth in claim 1 in which the circulating means for delivering underflow from the cyclone separator to the well includes mixing means adapted to receive underflow from the high-pressure cyclone separator, means for delivering drilling mud from the mud pit to the mixing means at a controlled rate to prepare a drilling mud of the desired high density, and means for delivering drilling mud of the desired high density from the mixing means into the well.

3. In the rotary drilling of wells with a weighted drilling mud in which drilling mud discharged from the well is passed through a shale shaker to remove cuttings therefrom, delivered from the shale shaker to a mud pit and circulated by circulating means from the mud pit to the well for circulation through the well, said shale shaker, mud pit, and circulating means comprising a circulating system, an improved method of increasing the density of drilling mud in the well comprising maintaining outside of the circulating system a supply of weighted drilling mud having a density of 12 to 14 pounds per gallon obtained from a previously drilled well, passing a stream of the 12 to 14 pounds per gallon drilling mud through a cyclone separator at a rate causing a pressure drop of at least 500 psi in the cyclone separator to separate the 12 to 14 pounds per gallon drilling mud into an underflow stream having a density of 16 to 20 pounds per gallon and an overflow stream, and delivering the underflow stream to the well without passing through the mud pit.

4. A method as set fourth in claim 3, in which the underflow from the cyclone separator is mixed with drilling mud circulated from the mud pit by the circulating means before delivery into the well.

5. A method as set forth in claim 3, in which circulation of drilling mud from the mud pit to the well is interrupted and the underflow from the cyclone separator is delivered into the well during said interruption.

6. A method as set forth in claim 3, in which the underflow is discharged into a mixing tank, drilling mud is delivered from the mud pit into the mixing tank at a controlled rate and mixed with the underflow to form a high-density drilling mud of the desired density, and the high-density drilling mud is delivered to the well.

* * * * *